(12) United States Patent
Schmidt et al.

(10) Patent No.: US 11,736,543 B2
(45) Date of Patent: *Aug. 22, 2023

(54) INTERNET PROVIDER SUBSCRIBER COMMUNICATIONS SYSTEM

(71) Applicant: PERFTECH, INC, San Antonio, TX (US)

(72) Inventors: Jonathan E. Schmidt, San Antonio, TX (US); Henry M. Donzis, San Antonio, TX (US); Lewis T. Donzis, San Antonio, TX (US); Rodney D. Frey, San Antonio, TX (US); John A. Murphy, San Antonio, TX (US)

(73) Assignee: PERFTECH, INC, San Antonio, TX (US)

( * ) Notice: Subject to any disclaimer, the term of this patent is extended or adjusted under 35 U.S.C. 154(b) by 295 days.

This patent is subject to a terminal disclaimer.

(21) Appl. No.: 17/094,767

(22) Filed: Nov. 10, 2020

(65) Prior Publication Data

US 2021/0067575 A1 Mar. 4, 2021

Related U.S. Application Data

(63) Continuation of application No. 16/379,684, filed on Apr. 9, 2019, now Pat. No. 10,834,157, which is a
(Continued)

(51) Int. Cl.
*G06F 15/16* (2006.01)
*H04L 65/60* (2022.01)
(Continued)

(52) U.S. Cl.
CPC ............. *H04L 65/60* (2013.01); *H04L 9/40* (2022.05); *H04L 67/02* (2013.01); *H04L 67/535* (2022.05);
(Continued)

(58) Field of Classification Search
CPC ..... H04L 65/60; H04L 67/535; H04L 67/563; H04L 67/564; H04L 67/2871; H04L 69/329

See application file for complete search history.

(56) References Cited

U.S. PATENT DOCUMENTS

| 4,272,493 A | 6/1981 | Subramanian et al. |
| 5,105,184 A | 4/1992 | Pirani et al. |

(Continued)

OTHER PUBLICATIONS

Anonymous, "TCP Flag Key", UNC Office of Arts and Sciences, Jan. 3, 2012.
Dorner et al., "Transport Control Protocol (TCP)", Nov. 2005.

*Primary Examiner* — Yves Dalencourt

(57) ABSTRACT

A system, method, and computer readable medium for communicating at least one real-time specially-composed bulletin message to at least one subscriber of a provider of Internet services, comprising a first device, and a second device communicably coupled to the first device, wherein the first device: accesses only subscriber upstream traffic to a destination web site requested by the subscriber, wherein the first device inter-connects between the at least one subscriber and the destination web site, identifies the at least one subscriber's identification based on the accessed subscriber upstream traffic automatically provided by the subscriber, and provides the unique subscriber identification to the second device located at the provider of Internet services providing data services and management control to the first device, wherein the second device determines the subscriber associated with the unique subscriber identification.

20 Claims, 3 Drawing Sheets

Related U.S. Application Data continuation of application No. 15/138,448, filed on Apr. 26, 2016, now Pat. No. 10,257,242, which is a continuation of application No. 14/338,110, filed on Jul. 22, 2014, now Pat. No. 9,325,760, which is a continuation of application No. 13/328,954, filed on Dec. 16, 2011, now Pat. No. 8,793,386, which is a continuation of application No. 11/895,623, filed on Aug. 24, 2007, now Pat. No. 8,095,666, which is a continuation of application No. 10/023,674, filed on Dec. 18, 2001, now Pat. No. 7,328,266.

(51) Int. Cl.
*H04L 67/02* (2022.01)
*H04L 69/329* (2022.01)
*H04L 9/40* (2022.01)
*H04L 67/50* (2022.01)
*H04L 67/563* (2022.01)
*H04L 67/564* (2022.01)
*H04L 67/2871* (2022.01)

(52) U.S. Cl.
CPC .......... *H04L 67/563* (2022.05); *H04L 67/564* (2022.05); *H04L 69/329* (2013.01); *H04L 67/2871* (2013.01)

(56) References Cited

U.S. PATENT DOCUMENTS

| | | |
|---|---|---|
| 5,481,562 A | 1/1996 | Pearson et al. |
| 5,724,525 A | 3/1998 | Beyers et al. |
| 5,740,549 A | 4/1998 | Reilly et al. |
| 5,751,956 A | 5/1998 | Kirsch |
| 5,894,479 A | 4/1999 | Mohammed |
| 5,913,040 A | 6/1999 | Rakavy et al. |
| 5,937,392 A | 8/1999 | Alberts |
| 5,974,451 A | 10/1999 | Simmons |
| 5,991,735 A | 11/1999 | Gerace |
| 6,014,698 A | 1/2000 | Griffiths |
| 6,041,356 A | 3/2000 | Mohammed |
| 6,141,010 A | 10/2000 | Hoyle |
| 6,148,332 A | 11/2000 | Brewer et al. |
| 6,188,398 B1 | 2/2001 | Collins-Rector et al. |
| 6,195,691 B1 | 2/2001 | Brown |
| 6,205,432 B1 | 3/2001 | Gabbard et al. |
| 6,286,001 B1 | 9/2001 | Walker et al. |
| 6,314,451 B1 | 11/2001 | Landsman et al. |
| 6,385,592 B1 | 5/2002 | Angles et al. |
| 6,438,125 B1 | 8/2002 | Brothers |
| 6,442,529 B1 | 8/2002 | Krishan et al. |
| 6,466,967 B2 | 10/2002 | Landsman et al. |
| 6,516,338 B1 | 2/2003 | Landsman et al. |
| 6,553,376 B1 | 4/2003 | Lewis et al. |
| 6,574,321 B1 | 6/2003 | Cox et al. |
| 6,584,492 B1 | 6/2003 | Cezar et al. |
| 6,594,305 B1 | 7/2003 | Roeck et al. |
| 6,594,706 B1 | 7/2003 | DeCoursey et al. |
| 6,598,082 B1 | 7/2003 | Douglis et al. |
| 6,615,039 B1 | 9/2003 | Eldering |
| 6,628,314 B1 | 9/2003 | Hoyle |
| 6,636,856 B2 | 10/2003 | Pasquali |
| 6,725,060 B1 | 4/2004 | Chhatriwala et al. |
| 6,725,203 B1 | 4/2004 | Seet et al. |
| 6,771,290 B1 | 8/2004 | Hoyle |
| 6,772,200 B1 | 8/2004 | Bakshi et al. |
| 6,779,118 B1 | 8/2004 | Ikudome et al. |
| 6,785,659 B1 | 8/2004 | Landsman et al. |
| 6,829,780 B2 | 12/2004 | Kraft et al. |
| 6,845,400 B2 | 1/2005 | Macpherson et al. |
| 6,880,123 B1 | 4/2005 | Landsman et al. |
| 7,213,071 B2 | 5/2007 | DeLima et al. |
| 7,227,889 B1 | 6/2007 | Roeck et al. |
| 7,237,251 B1 | 6/2007 | Oz et al. |
| 7,263,558 B1 | 8/2007 | Khirman et al. |
| 7,328,266 B2 | 2/2008 | Schmidt et al. |
| 7,409,456 B2 | 8/2008 | Sitaraman |
| 7,689,721 B2 | 3/2010 | Mousseau et al. |
| 8,095,666 B2 | 1/2012 | Schmidt et al. |
| 8,108,524 B2 | 1/2012 | Donzis et al. |
| 8,198,524 B2 | 6/2012 | Bastian et al. |
| 8,793,386 B2 | 7/2014 | Schmidt et al. |
| 8,838,809 B2 | 9/2014 | Donzis et al. |
| 9,307,041 B2 | 4/2016 | Donzis et al. |
| RE46,459 E | 6/2017 | Ikudome et al. |
| 9,727,658 B2 | 8/2017 | Donzis et al. |
| 10,225,210 B2 | 3/2019 | Donzis et al. |
| 10,616,131 B2 | 4/2020 | Donzis et al. |
| 10,834,157 B2 * | 11/2020 | Schmidt ............... H04L 67/564 |
| 11,336,586 B2 | 5/2022 | Donzis et al. |
| 2001/0049737 A1 | 12/2001 | Carolan et al. |
| 2002/0049968 A1 | 4/2002 | Wilson et al. |
| 2002/0113994 A1 | 8/2002 | Smith et al. |
| 2002/0116531 A1 | 8/2002 | Chu |
| 2002/0116645 A1 | 8/2002 | Cloutier et al. |
| 2002/0132607 A1 | 9/2002 | Castell et al. |
| 2002/0133565 A1 | 9/2002 | Huat |
| 2002/0143981 A1 | 10/2002 | DeLima et al. |
| 2003/0014539 A1 | 1/2003 | Reznick |
| 2003/0093516 A1 | 5/2003 | Parsons et al. |
| 2003/0106067 A1 | 6/2003 | Hoskins et al. |
| 2004/0015405 A1 | 1/2004 | Cloutier et al. |
| 2004/0073812 A1 | 4/2004 | Wesinger et al. |
| 2004/0230659 A1 | 11/2004 | Chase |
| 2005/0114458 A1 | 5/2005 | Gottlieb |
| 2006/0095525 A1 | 5/2006 | Mousseau et al. |
| 2007/0081543 A1 | 4/2007 | Brenes et al. |
| 2008/0043694 A1 | 2/2008 | Mousseau et al. |
| 2008/0109521 A1 | 5/2008 | Mousseau et al. |
| 2014/0351690 A1 | 11/2014 | Donzis et al. |
| 2017/0357727 A1 | 12/2017 | Donzis et al. |

\* cited by examiner

INTERNET PROVIDER SUBSCRIBER COMMUNICATIONS SYSTEM

CROSS-REFERENCE TO RELATED APPLICATIONS

The present invention is a continuation of patent application Ser. No. 16/379,684, titled INTERNET PROVIDER SUBSCRIBER COMMUNICATIONS SYSTEM, filed on Apr. 9, 2019, now issued U.S. Pat. No. 10,834,157, issued on Nov. 10, 2020, which is a continuation of patent application Ser. No. 15/138,448, titled INTERNET PROVIDER SUBSCRIBER COMMUNICATIONS SYSTEM, filed on Apr. 26, 2016, now issued U.S. Pat. No. 10,257,242, issued Apr. 9, 2019, which is a continuation of patent application Ser. No. 14/338,110, titled INTERNET PROVIDER SUBSCRIBER COMMUNICATIONS SYSTEM, filed on Jul. 22, 2014, now issued U.S. Pat. No. 9,325,760, issued on Apr. 26, 2016, which is a continuation of patent application Ser. No. 13/328,954, titled INTERNET PROVIDER SUBSCRIBER COMMUNICATIONS SYSTEM, filed on Dec. 16, 2011, now issued U.S. Pat. No. 8,793,386, issued on Jul. 29, 2014, which in turn is a continuation of patent application Ser. No. 11/895,623, titled INTERNET PROVIDER SUBSCRIBER COMMUNICATIONS SYSTEM, filed on Aug. 24, 2007, now issued U.S. Pat. No. 8,095,666, issued on Jan. 10, 2012, which in turn is a continuation of patent application Ser. No. 10/023,674, titled INTERNET PROVIDER SUBSCRIBER COMMUNICATIONS SYSTEM, filed on Dec. 18, 2001, now issued U.S. Pat. No. 7,328,266, issued on Feb. 5, 2008, the entire contents of each are incorporated by reference herein.

BACKGROUND OF THE INVENTION

1. Field of the Invention

The invention is generally related to customer relations and management communication systems and is more specifically directed to a method for the enforced delivery of messages to customer subscribers of an Internet Service or transport service provider.

2. Discussion of the Prior Art

Over the next several years in the U.S., 85 million new users will start using the Internet and 77% of U.S. households will be connected to the Web. Clearly, the Internet market will continue to grow in existing and altogether new ways. The Internet is now a critical part of our communications options. Innovation will continue to be a major factor associated with the Internet as enterprising companies find new ways to offer faster, more expanded services ranging from access, security, quality and class of services, as well as content offerings. No matter what these expanded services or applications turn out to be, the rapid adoption of Internet use will continue to increase and that increase will have profound effects on the providers who support these millions of users.

Currently, the providers that physically connect subscribers to the Internet are very limited in their ability to communicate back to their subscriber base. If a provider wants to communicate with customers about planned outages or problems, viruses being broadcast from the subscriber PCs, billing issues, or emergency information, the provider is limited to some very unreliable approaches such as phone calls, e-mails, or bulletins in monthly billing statements. None of these approaches offer assured timely delivery, and most require a great deal of effort with uncertain results. Today the common method used to notify the subscriber is to let the subscriber discover the particular problem and then contact the provider for assistance and information. Unlike cable television wherein the cable company can force "crawlers" and other informational communication to the viewer's television screen, the Internet service provider must rely upon the subscriber to voluntarily and manually access the informational Web pages that relate to the subscriber's system. The subscribers of the provider may not use or reveal other services that might have been useful such as their use of e-mail or even their e-mail addresses. The other customer relations communication channel used by the provider is the accompanying flier that is mailed with the monthly bill. These channels are unreliable and not timely for much of the communication that the provider could utilize that would substantially reduce the cost of supporting the subscriber base. A simple example is enforced notification of scheduled system "down time" due to maintenance. Virtually all subscribers who are notified of an upcoming service interruption will not place the support telephone calls that typically inundate the provider support facilities under such circumstances.

Due to the ever growing Internet subscriber population, a solution that could avoid these calls would not only greatly reduce the unnecessary call volume being placed on provider call support centers, but would also help improve customer confidence, leading to better customer loyalty and retention.

Enforced delivery of messages has been available with auxiliary client software components such as enrollment and use of an "Instant Messaging" system as offered by AOL and Microsoft. Enforced delivery of messages has also been available with auxiliary client software components associated with certain provider authentication protocols. In all cases, the software becomes machine, operating system, and operating system version dependent, must be installed by the subscriber, and the installation must be supported by the provider.

U.S. Pat. No. 6,148,332, entitled: MANDATORY MESSAGE DISPLAY AND REPORTING SYSTEM, issued to C. M. Brewer on Nov. 14, 2000 discloses a messaging system including a software program to be loaded on a PC that is closely linked to the PPP ("The Point-to-Point Protocol," as defined by RFC 1661) or PPPoE ("A Method for Transmitting PPP Over Ethernet," as defined by RFC 2516) that the Internet service provider provides. Specifically, this is "LOG-ON" software that the user must have in order to initiate and maintain service. The intent of the application is to force advertising windows on the subscriber's screen, i.e., a mandatory display. The main components of this system is that the software must be loaded on the subscriber PC, the window is specifically not on the Web browser and the advertising window cannot be removed without losing the connection to the Internet service provider service.

SUMMARY OF THE INVENTION

The subject invention specifically eliminates a requirement for any client software components and specifically utilizes Web page access. Automatic modification of the content of received data also can be accomplished with other unmodified Web applications in accordance with the invention. The invention presents a Web page as a replacement for the subscriber-requested page, within the requested page, or as an additional "pop-up" browser window. Enforcement takes advantage of the near-universality of Web browser utilization and of the protocol to log successful deliveries. In accordance with the teachings of the invention, the elimination of a client software component can create the entirety of the functionality of the system in a hardware or software device that can be distributed throughout the provider infrastructure through a simply installed, fail-safe network connection without customer participation in the installation process.

The architect of the invention is adopted to unobtrusively co-exist with the current Internet transport networks, providing critical performance monitoring and automated messaging to insure that transport network operators, ISPs, content providers, and the subscribers have communication links. The method of the subject invention provides users with active screens informing them of transport or Internet Service Provider network problems, thus allowing customers to know of any situation real-time and avoid overwhelming the provider's congested call-centers with costly and unnecessary trouble-report calls. In addition, subscribers will be able to monitor their own Internet performance and differentiate problems between transport and content parties and avoid the costly inquiry calls that would otherwise occur. The estimated payback in technical support call reduction alone is a matter of a couple of years with indirect customer satisfaction increasing the true value much more. The reduction of technical support center calls provides a very attractive payback to the providers. In addition, other services may be offered by facilitating localized content delivery such as emergency information and/or advertising. Once the invention, which may be implemented as a hardware device, or as software running on a standard computer system, is merged within the provider network, additional services are provided through software upgrades at the provider without requiring installation at the user's site. Specifically, all of this is done within the network without touching subscriber equipment.

The subject invention allows providers to have an active vehicle with which to communicate to a subscriber (or subscriber group) while the subscriber is browsing the Internet. These services are manifested in a number of ways depending on the providers' physical and logical network architecture. The methodology is addressable to all IP provider connection approaches from Broadband (Cable, DSL, Satellite, Fixed Wireless) to traditional dial-up services.

In addition to offering the provider a cost savings proposition in technical support call elimination and in improving customer confidence, the system of the subject invention also offers the Provider a way to directly reach subscribers by particular demographics for emergency information and advertising purposes. Within the realm of advertising, the ability to tie ad content to local geographic as well as subscriber demographics will allow very specific ad content to be presented to subscribers.

The preferred embodiment of the invention can be entirely contained within a hardware or software device that is connected to the provider network that performs the modification of the Web information delivered to the subscriber. The enforcement can be guaranteed with Web browser activity by the targeted subscriber. The near-universality of Web browser utilization by Internet subscribers presents a near-universal enforcement of the desired customer management communication from the provider to the subscriber and on a real-time basis.

The provider creates the special communication through the three-part definition:
1. Customer identification by account number, modem MAC address or serial number, or other fixed identifier
2. The policy of delivery describing the circumstances of delivery such as time of delivery, frequency, triggering activity, and the like.
3. The associated Web page or other content to be delivered and type of page delivery (replacement, insert, pop-up).

The system relies upon any of several standard router mechanisms to redirect Web traffic. Some existing protocols developed for transparent Web caching permit the installation to take place while the system is fully operational and renders it immune to device failure by supporting normal functionality should the device fail. These protocols are preferred but not necessary.

The system examines the source IP address of a request and, if not cached, makes a query to obtain the customer identification to check if a policy is in force. There are different protocol options that can be utilized to obtain this relationship that may be kept in DNS (Domain Name System), DHCP ("Dynamic Host Configuration Protocol," as described in RFC 1531), LDAP ("Lightweight Directory Access Protocol," as described in RFC 1777), or external database servers. The device endeavors to utilize the valid duration of these relationships to cache the information and reduce network administrative message overhead.

When no policy is in force for a particular subscriber or group of subscribers, the connection is allowed to proceed normally and the expected Web page is displayed. If a policy is in force for that subscriber, the policy is enforced and, as an example, the subscriber may see a "pop-up" browser window appear containing special customer communications. The pop-up window can request further action or utilize any of the rich array of options available in Web browsers.

In systems with many devices connected, an optional management console can be utilized to consolidate the numerous devices into presenting itself as a single system to the existing provider infrastructure. This consolidation can reduce or eliminate administrative overhead of the existing provider infrastructure when expanding or changing the system of devices. The management console can also consolidate the administrative activity of the Web redirecting devices to reduce that overhead.

In one embodiment of the present disclosure, a method for communicating at least one real-time specially-composed bulletin message to at least one subscriber of a provider of Internet services, comprising the steps of: accessing, by a redirecting device, only subscriber upstream traffic to a destination web site requested by the subscriber, wherein the redirecting device inter-connects between the at least one subscriber and the destination web site; identifying, by the redirecting device, the at least one subscriber's unique identification based on the accessed subscriber upstream traffic automatically provided by the subscriber; providing, by the redirecting device, the unique subscriber identification to a consolidating and management device located at the provider of Internet services providing data services and management control to the redirecting device; determining, by the consolidating and management device, the subscriber associated with the unique subscriber identification, and if the specially-composed bulletin message for the subscriber is desired to be communicated: sending, by the consolidating and management device, policy information related to the data services and management control, to the redirecting device, wherein the policy information includes an IP address of the subscriber's device, and at least one of: the specially-composed bulletin message, a modification of the message to be performed for the IP address, a reference to the message, and a redirection to the message; examining, by the redirecting device, the accessed upstream traffic to determine if it is possible to send a redirection, wherein the examining occurs without modifying the accessed upstream traffic; and forcing a delivery of the specially-composed message according to policies set by the provider of Internet services or the cable system operator irrespective of the subscriber's intended destination; if the specially-composed bulletin message for the subscriber is not desired when no policy is in force for the subscriber, allowing, by the redirecting device, a direct connection from the subscriber to the destination site to proceed normally, and sending, only by the destination site, downstream web traffic to the subscriber without forwarding the downstream web traffic through or by the redirecting device; based on the policy information, sending to the subscriber by the redirecting device, the at least one of: the specially-composed bulletin message, a modification of the message to be performed for the IP address, a reference to the message, and a redirection to the message; and wherein the specially-composed bulletin message originates from the different destination site.

In another embodiment of the present disclosure, a computer readable medium comprises instructions for: accessing only subscriber upstream traffic to a destination web site requested by a subscriber; identifying the subscriber's unique identification based on the accessed subscriber upstream traffic automatically provided by the subscriber; providing the unique subscriber identification to a consolidating and management device located at a provider of Internet services providing data services and management control; determining, by the consolidating and management device, the subscriber associated with the unique subscriber identification, and if the specially-composed bulletin message for the subscriber is desired to be communicated: sending, by the consolidating and management device, policy information related to the data services and management control, wherein the policy information includes an IP address of the subscriber's device, and at least one of: the specially-composed bulletin message, a modification of the message to be performed for the IP address, a reference to the message, and a redirection to the message; examining the accessed upstream traffic to determine if it is possible to send a redirection, wherein the examining occurs without modifying the accessed upstream traffic; and forcing a delivery of the specially-composed message according to policies set by the provider of Internet services or the cable system operator irrespective of the subscriber's intended destination.

In a further embodiment of the present disclosure, a system for communicating at least one real-time specially-composed bulletin message to at least one subscriber of a provider of Internet services, comprises a first device; and a second device communicably coupled to the first device; wherein the first device: accesses only subscriber upstream traffic to a destination web site requested by the subscriber, wherein the first device inter-connects between the at least one subscriber and the destination web site; identifies the at least one subscriber's unique identification based on the accessed subscriber upstream traffic automatically provided by the subscriber; provides the unique subscriber identification to the second device located at the provider of Internet services providing data services and management control to the first device; wherein the second device determines the subscriber associated with the unique subscriber identification, and if the specially-composed bulletin message for the subscriber is desired to be communicated: the second device sends policy information related to the data services and management control, to the first device, wherein the policy information includes an IP address of the subscriber's device, and at least one of: the specially-composed bulletin message, a modification of the message to be performed for the IP address, a reference to the message, and a redirection to the message; the first device examines the accessed upstream traffic to determine if it is possible to send a redirection, wherein the examining occurs without modifying the accessed upstream traffic; and the first device sends the redirection if it is possible to do so.

DETAILED DESCRIPTION OF THE PREFERRED EMBODIMENT

Figure 1:
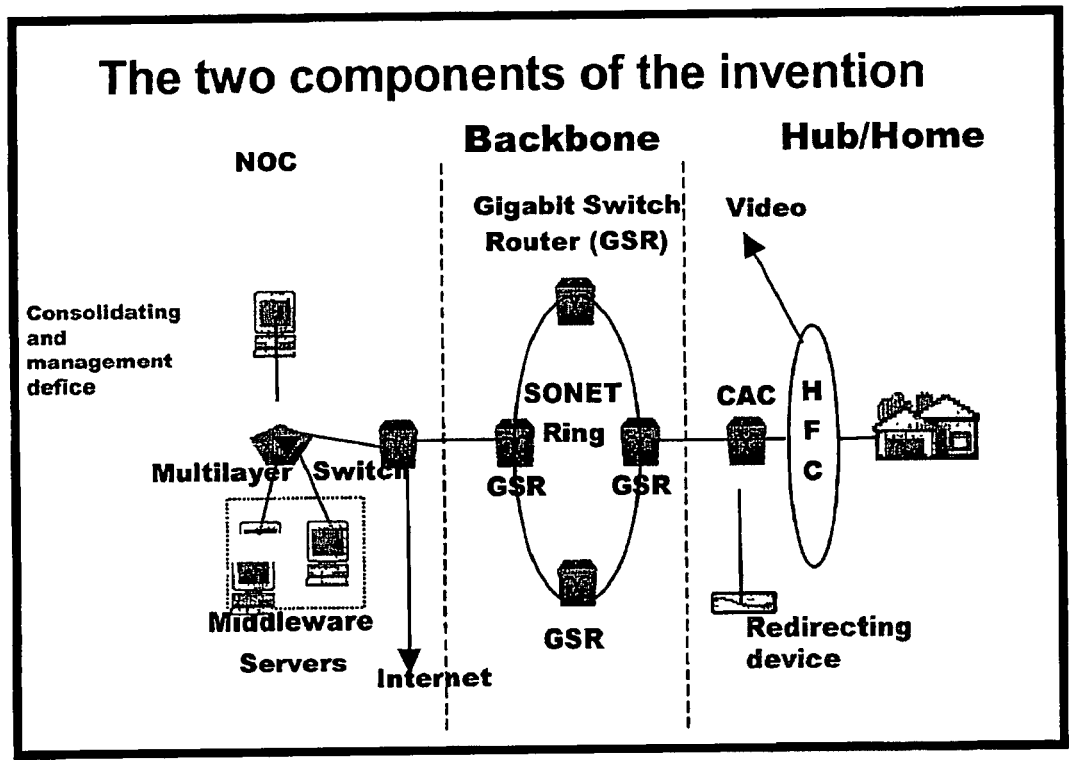
FIG. 1 shows the two components of the invention: the redirecting device and the consolidating and management device.

The architecture of the preferred invention is designed especially to adapt to a cable operator's IP network. Comparable components and protocols exist in other broadband systems such as DSL and wireless as well as other Internet service provider transports, such as analog and digital dialup and private line environments, for which the scope of the invention is intended to include.

Internet service and transport providers provide their subscribers with a pipeline to the Internet, but are not directly involved in the content obtained by those subscribers. Typically, this pipeline is transparent to the user, with no modification of its content along the path. In some cases, web caching or other performance enhancement technology may be provided, but this still strives to maintain the original content. The invention provides a method and apparatus whereby this content may be modified or replaced along the path to the subscriber. For the purposes of establishing a reliable delivery of bulletin messages from providers to their subscribers, the invention specifically forces the delivery of specially-composed World Wide Web browser pages to the subscriber, although it is not limited to that type of data. These may be displayed permanently, temporarily, or in separate pop-up browser windows, according to policies set by the provider irrespective of the subscriber's intended browsing destination. The result of this system is the ability of the provider to make use of communications to subscribers without the requirement of a special client software component to be present on the user's personal computer or other browsing device. Another benefit of the invention is its implementation as a hardware or software device that incorporates simplified, fail-safe integration into the provider's infrastructure. In addition, due to the use of the standards of World Wide Web browsers, all the Web features, such as interactivity in the same or separate popup windows, become available to the provider. The policies set by the provider can be for specific users or groups of users with identified characteristics or activity.

Over 90% of cable television system operators in the United States provide high speed (broadband) Internet access through their system with an early adoption rate of 8% in the U.S. and 5% globally.

Cable systems, upgraded to serve digital channels, can support data-over-cable Internet access through the industry standard, DOCSIS, which sends the Internet data inside a compatible packet in the same form as digital TV's MPEG2. In addition to supporting MPEG2 digital television, the Internet access infrastructure is required to support upstream data in the 5 to 45 MHz spectrum for the 2-way Internet activity.

A variety of early adopters experimented with several schemes to transport two-way data over existing cable infrastructure, however, DOCSIS emerged as the standard. The DOCSIS 1.0 Radio Frequency Interface (RFI) Specification SP-RFI-I05-991105 is what the majority of US vendors and cable operators have agreed to implement. In addition, the industry supports an interoperability laboratory that tests and enforces compatibility complete with certification labels.

The spectrum on the cable plant allows for downstream, or forward, path signals that occupy the 54- to 860-MHz band, with channels spaced at the standard 6 MHz originally designed to handle the over-the-air: NTSC video signals. In fact, the entire cable infrastructure retains this channelized imprint from the over-the-air spectrum.

The upstream, or return path DOCSIS signals generally occupy from 5 to 42 MHz (a spectrum not used by over-the-air television and, in fact, is the spectrum used by "short wave" broadcast when propagated over the air). The upstream spectra can, therefore, have variable channel spacing, depending on the signal's type and format. Because of the noisy and legacy design implications, upstream signals with DOCSIS are limited in bandwidth and, as with the Cisco CMTS (Cable Modem Termination System), broken up into six upstream segments each individually allocated to a small neighborhood of approximately 200-300 houses.

The choice of employing compatibility with the legacy 6 MHz channelization permits compatibility with other parts of the system allowing a minimal amount of disruption to the existing infrastructure when it DOCSIS-compatible Internet data access is added. In addition, much of the upgrades in plant and equipment required for the provisioning of broadband Internet access are in common with the upgrades needed to expand service to digital television services and pay-TV which can fit from 4 to 12, typically 6, digital channels into each of the same 6 MHz channels of the spectrum.

The digital channels have digital data encoded in MPEG2 frames that include the DOCSIS data. The DOCSIS data can utilize an entire 6 MHz channel or be interleaved with other services but that is not known to be a feature that is utilized. Each frame includes a program identifier, PID, of which the DOCSIS data is allocated one: HEX IFFE. The cable modem searches for the channel with the DOCSIS PID when it is powered up. The channel can be any of the system channels but is typically in the digital channel range above 350 MHz.

Once the DOCSIS modem finds its downstream data, the dialog begins negotiations with the head end to determine various parameters of operation such as the upstream channel, the power of the modem's transmitter, modulation technique, symbol rate, and finally the negotiation into an encrypted communications session using X509 certificates based upon a combination of data permanently installed in the cable modem:

A serial number
A cryptographic public key
An Ethernet MAC address
The manufacturer's identification Further system authentication integrates the registration of the modem and customer's account within the billing system. The ability to communicate directly with customers or groups of customers sharing a common problem directly relieves a substantial portion of the support burden from both transport and ISP vendors. It will also improve support quality and customer satisfaction.

For the preferred embodiment, the simplest environment, that of a broadband cable system, is used as an example. In such a cable system over which broadband Internet data is offered, there are two basic types of devices in the invention as shown by FIG. 1.

Redirecting device—a device residing in the neighborhood along with the cable access concentrator. This product is intentionally located at the edge of the network, providing intelligence at the last scalable point in the cable operators' IP network (in closest proximity to the subscriber). The number of redirecting devices will replicate the number of access concentrators within the network, and the device will inter-connect to one of the access concentrator's Ethernet ports, or in a manner as to have access to subscriber upstream traffic. This device could be located anywhere in the infrastructure where access to subscriber upstream traffic is available, but the closer it is located to the subscriber, the greater the possibility for delivering messages due to upstream service outages.

Consolidating and managing device—a device located in the cable operator's NOC (Network Operations Center) providing data services and management control to the deployed redirecting devices. This product will be interconnected to the NOC network, which interconnects all of the NOC servers as well as the Internet portal.

Bulletin Services and the Benefits:

The location of the bulletin services equipment can be made optimal for solving the very set of problems described above. When located at each uBR/CMTS (Universal Broadband Router, Cisco's name for its Cable Modem Termination System product line), it can survey the state of the upstream and downstream network and automatically provide high visibility of the status to the customer. It can deliver individual content to specified users or groups with individually tailored policies (frequency, circumstances, pop-up, banner, front, back, etc.). It can target customers issuing packets with signatures of virus-generated communication. And, it can determine upstream problems and assign the trouble to either the transport vendor or the Internet service provider for further action, if required, or simply eliminate the call because of the visibility of the problem and the subsequent reinstitution of operation.

The bulletin services clearly can eliminate service calls: Many "problems" are not problems and can be eliminated, such as providing the customer a pre-announcement of a scheduled maintenance downtime or a clear description of an existing, general Internet problem out of the control of the local system. Problems that are quite deterministic as to which vendor owns the responsibility can often be automatically determined. Unless the entire system is totally "dead," the trouble call can be deflected to the responsible vendor with some helpful information. Customers under the influence of a "virus" can cause the system a lot of trouble without the customer having visible symptoms. Real-time communications with the customer can, often automatically, enlighten that customer to the contamination and possibly issue a required repair procedure which, if ignored, might result in the subscription being temporarily disabled.

Direct communication with the Internet access customer has been used effectively for several years through pop-ups and banners, but these have only been issued from the destination site that was sought by the browsing customer. They have been used for extending the advertising viewing space and time as well as for special information bulletins issued from that destination site.

Direct communication with the customer from the transport vendor or ISP vendor, independent of the destination sought by the customer and without blocking the customer's access to that destination has not been previously developed and, therefore, available. However, the services that directly target real-time bulletins can provide a mechanism that forges a general-purpose facility and provide this capability.

Virtually all calls due to downtime that had been previously scheduled and announced. That could easily be a sizable portion of the installed base.

Virtually all calls that can be automatically diagnosed as non-local, upstream Internet congestion whether assigned to a particular provider or general Internet malfunctions. Progress on the problem can be presented in a bulletin.

Virtually all calls that are due to local infrastructure outages that are upstream of the uBR/CMTS. These problems can be diagnosed and announced automatically or manually to the customer. Progress in repair can be highly visible to the customer who will get better information by viewing the real-time bulletin of the progress than holding on a telephone line.

Virus preventative cut-offs.

Problems in the first category are clearly stated to the customer as being supported by the carried provider. Calls to will be immediately re-directed to the provider. Trouble in the second category is often associated with a general cable outage and usually results in a call to the cable television repair service first. In such cases, both are re-instituted simultaneously and the appearance of a working TV is the signal for the recovery of the cable modem. Troubles in the third category will result in an "informational" call of short duration.

This brief analysis indicates that bulletin services can eliminate most calls, the longest and most complicated calls, and clearly increase customer satisfaction. The reduction in calls affects both Level-1 call-center personnel as well as Level-3 "last resort", highly trained personnel.

The Bulletin Services can Reduce Other Network Personnel Overhead:

The location of the bulletin services device at the uBR/CMTS permits it to check every connection for the signature of a virus-generated "storm" that causes system-wide degradation. It is also in the position to be directed, manually, by network personnel, to inform the customer that a virus infection is causing difficulties on his PC and that remedial action is required. A written bulletin can include step-by-step procedures to remedy the problem saving a rather lengthy telephone dialog.

This capability can be extended to react to a variety of signals of misuse activity of the system by customers either automatically or by simple, manual issuance of an appropriate bulletin.

The network support personnel are the most highly paid and notoriously overworked. Reductions in these areas are clearly highly valuable.

Redirecting Device Environment

Figure 2:
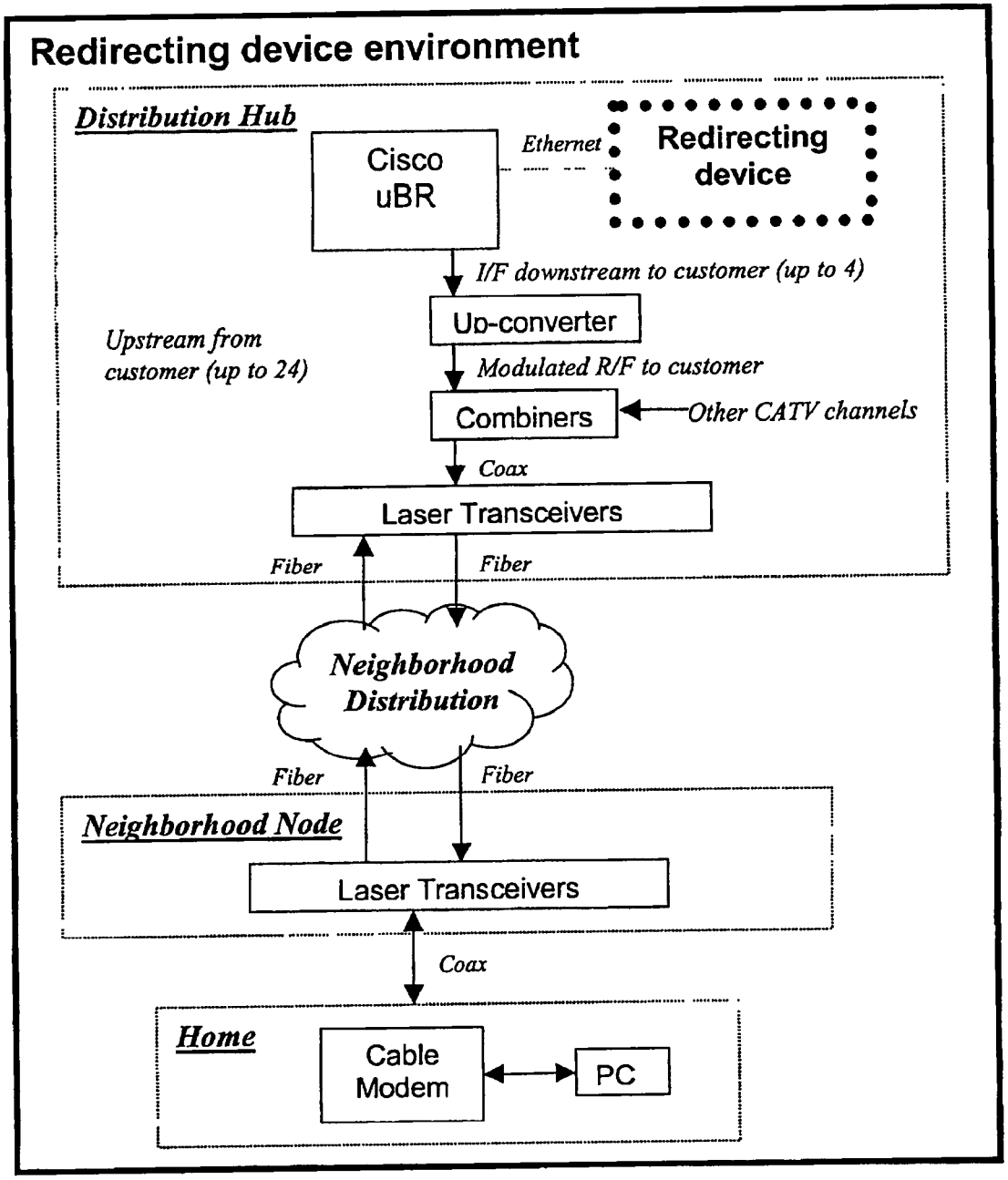
FIG. 2 shows the redirecting device at the network edge with the cable access concentrator/router and other various network components.

FIG. 2 shows the redirecting device at the network edge with the cable access concentrator/router and other various network components:

Platform Specification

Hardware chassis (e.g., NEBS-compliant or standard rack mount, or stand-alone), with processor, RAM, non-volatile storage. This may be offered as an integral hardware solution running a standard or an embedded operating system, or as a software solution running on a standard PC/UNIX/Mac workstation or other computer system.

Optional facilities for configuration, troubleshooting, and out-of-band management.

Interface to the provider infrastructure, e.g., Ethernet, SONET, and the like.

Redirecting Device Software Block Diagram

Figure 3:
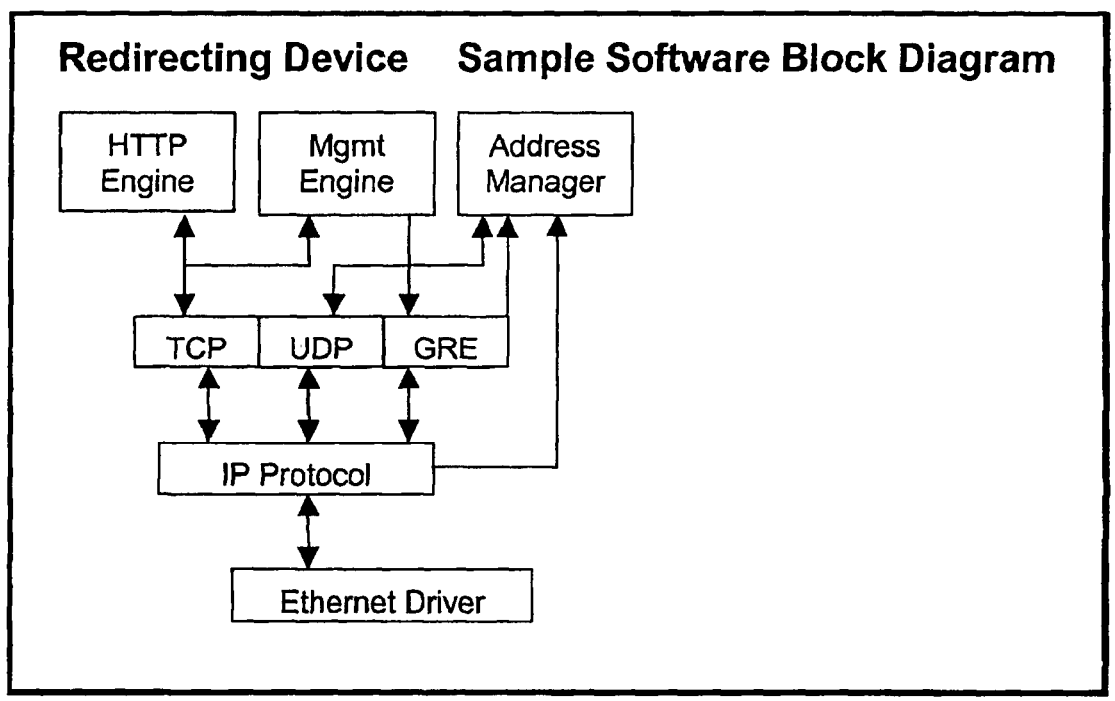
FIG. 3 provides a summary of how the redirecting device navigates through the four critical modules.

FIG. 3 provides a summary of how the redirecting device navigates through the four critical modules. The HTTP engine accepts connections for pages that may need to be replaced, parses URL, determines replacement strategy, provides replacement pages from the policy database, and proxies to a "real" server on an as-needed basis. The management engine receives and stores policy from the system, provides replacement policy as requested by the HTTP engine, notifies the GRE and IP layers (Generic Routing Encapsulation, as defined by RFC 2784) of address policy (i.e., intercept or not, lifetime and the like), and implements management protocol between redirecting and management devices. The address manager is notified by the GRE and/or IP when a new address is detected, and requests address information between redirecting and management/consolidating devices and will asynchronously send to the policy engine. When GRE is used, such as when WCCP is used to insert the redirecting device into the network, the GRE is implemented for high performance, and examines incoming packets from the Ethernet driver. If the is not any fragmentation and the source address is known and does not require interception, the packet can immediately be transmitted back to the router. This ensures good performance for the most likely cases. If fragmentation does exist, the packet is given to the IP layer for further processing and the completed packet is then given by the IP layer back to the GRE for processing. If the IP address includes a policy that requires further processing, the GRE header is removed and sent back to the IP stack for further processing by the HTTP engine.

With specific reference to FIG. 3, the following should be noted:

Software Application Specification—WCCP v1 and v2, unicast and multicast,

GRE support, L2 support as it becomes available from Cisco.

Cisco-like command line interface.

SNMP (Simple Network Management Protocol) support as required.

Protection from access by consumers, e.g., filters and/or SSH (Secure Shell).

Keeps policy list by IP address, as provided by Bulletin Manager.

For non-intercepting IP addresses, packet is vectored back to router at wire speed.

For intercepting, box must proxy to real server in order to have access to reverse traffic.

Traffic modification replaces page, which can provide new content, a redirection to a different page (possibly on another server), or provide a pop-up with the main page fetching the originally-requested content.

Traffic modification based on schedule policy:

One-shot

Interval

Frequency-changing interval

Acknowledgement from user can modify policy

Policy loaded by bulletin manager
Additional Specifications
The consolidating and management device is located in the NOC and licensed based on number of deployed devices within the operating network:
Platform Specification
Same specifications as redirecting device except:
Faster CPU with additional RAM
Larger storage facility
Additional Interfaces similar to other NOC oriented hardware
Software Application Specification
Protocol between devices should be open and publishable
Front-end management console allows:
Defining redirecting devices
Obtaining status/configuration of redirecting devices
Defining policy
Loading web pages to be distributed
Back-end management:
Monitoring/upgrading redirecting devices
Integrates with customer systems, including billing
Integrates with DHCP or other address management system to cross-reference customer ID with current IP address.
Implementation Approach
Whenever a redirecting device receives a TCP SYN packet, it looks in its table to find the IP address of the source. If the address is not in the table, or is expired, it sends a request to the address management device, along with a unique identifier for any policy that it has cached for that IP address (in the case of an expired entry). Depending on configuration, it could then forward the original packet back to the router, or discard or delay the packet. If the address is unknown, it also creates an entry for the IP address with a short expiration, so that it will not query the consolidating and management device again for a little while.

The address management device then queries the address management database (e.g., DHCP) to obtain the Cable Modem address associated with that IP address, and may also obtain the DHCP lease expiration time. Once the consolidating and management device determines the user associated with the IP address, if a message for that user is desired, then it can send new policy information to the directing device along with a unique identifier for that policy. If the unique policy identifier sent by the redirecting device indicates that the redirecting device already has the correct policy information available, then the consolidating and management device does not need to re-send it; it can just re-activate it. In addition, the DHCP lease expiration time is sent, even if no message is desired. The redirecting device updates its table so that it will not query the consolidating and management device again concerning that IP address until the DHCP lease expires, or more likely, some fraction of that time, perhaps with a limit.

The loading of the policy from the consolidating and management device to the redirecting device is asynchronous from the above processing, i.e., the redirecting device will simply continue to reflect packets for the IP address until the policy information changes. Likewise, if there is a failure in the communications between the redirecting device and consolidating and management device, including the consolidating and management device itself, then the redirecting device will simply reflect packets back to the router.

In some cases, the consolidating and management device will send policy information to the redirecting device before being queried by the redirecting device. When a redirecting device initializes, it will send a packet to the consolidating and management device indicating that it is starting fresh. If the consolidating and management device knows of policy information that should exist in that redirecting device, it can send it ahead of any requests by users.

In addition, a consolidating and management device must maintain a list of addresses located at each redirecting device, so that if consolidating and management device is loaded with new policy information, it can send that policy immediately, rather than waiting for the address lease to expire.

When a consolidating and management device sends a policy to a redirecting device, it should include the IP address, and, for neighborhood-wide messages, a mask, and the message or modification to be performed for that address. When a redirecting device expires the IP address from its cache, it should also deactivate the policy, but keep the policy available. A single policy may be applied to multiple IP addresses.

When a redirecting device receives a connection for which it wants to send a message, it accepts the connection as if it is the server, so that the HTTP GET message is seen. Then, the URL and HTTP header can be examined as required. If it is then desired to send a replacement message, a redirecting device creates a socket that will appear to be the server and send the replacement page back to the user, as if it is the server. If the page is not to be replaced, the redirecting device will connect to the real server and proxy the data back to the user.

Care must be exercised when sending a replacement or modified page to do so at an appropriate point in the data stream. For example, if a GET is requesting a JPEG image, then it is not possible to substitute an HTML document. Only a GET that is requesting an initial page should be allowed. This can generally be determined by examining the HTTP header.

What is claimed is:

1. A method, comprising:
    accessing, by a redirecting device, subscriber upstream traffic to a destination web site requested by a subscriber, wherein the redirecting device inter-connects between the subscriber and the destination web site;
    receiving, by the redirecting device from a consolidating and management device located at a provider of Internet services, policy information related to data services and management control provided by the consolidating and management device;
    examining, by the redirecting device, the accessed subscriber upstream traffic to determine whether to send a redirection to the bulletin message to the subscriber, wherein the examining occurs without modifying the accessed subscriber upstream traffic; and
    based on the policy information, sending to the subscriber by the redirecting device, the redirection to the bulletin message.

2. The method of claim 1, wherein if the bulletin message for the subscriber is not desired when no policy is in force for the subscriber, allowing, by the redirecting device, a direct connection from the subscriber to the destination web site to proceed normally, and sending, by the destination web site, downstream web traffic to the subscriber without forwarding the downstream web traffic through or by the redirecting device.

3. The method of claim 1, wherein the bulletin message is at least one of:
    an area within a window on the subscriber PC's browser;
    a prompt provided on the subscriber PC;
    originates from a different destination site; and
    selectively sent to a pre-selected subscriber group.

4. The method of claim 1, wherein the subscriber is at least one of:
a customer identification comprising at least one of an account number, a modem MAC address, serial number or a fixed identifier; and
identified to belong to a defined group of subscribers.

5. The method of claim 1, wherein the examining step further includes at least one of:
working through Web browsers irrespective of the World Wide Web destination sought by the subscriber;
working with multiple types of content;
performed by a hardware device connected at various points, in plurality, in a provider infrastructure;
provided by a software system installed on a computer system connected at various points, singly or in plurality, in a provider infrastructure;
includes an ability to acquire knowledge of the policy information and the identifier when a Web or other request is detected with only an identifying IP address;
minimizing overhead of acquiring subscriber parameters through caching of subscriber information for a determined portion of time;
performed in connection with the consolidating and management device for permitting a group of redirecting devices to be viewed as a single system.

6. The method of claim 5, further including at least one of:
returning the subscriber to the original World Wide Web destination after the bulletin message has been transmitted; and
providing optional fail-safe operation of each device such that failure does not disrupt other normal browsing and Internet activity of the subscriber but results only in an interruption of bulletin message delivery.

7. The method of claim 1, further including at least one of:
defining a policy for controlling selective transmission of bulletin messages to the subscriber;
defining a policy that includes a Web URL or other page information;
defining a policy that includes timing and frequency of delivery; and
defining a policy for activating the redirecting device to deliver a message in response to a selected subscriber activity.

8. The method of claim 7, wherein the activity comprises at least one of:
a defined destination,
an amount of activity by the subscriber, and
a request carrying a signature of virus contamination.

9. The method of claim 1, further comprising identifying, by the redirecting device, the at least one subscriber's unique identification based on the accessed subscriber upstream traffic automatically provided by the subscriber, wherein the identifying step uses an enforced delivery of a Web page to be used in a distribution and subscription of new subscribers without prior knowledge of serial numbers associated with the new subscriber's interface equipment and without requiring the subscribers to utilize special software.

10. The method of claim 9, further comprising at least one of:
using the enforced delivery of a Web page to reduce a volume of telephone support requests by an enforced pre-announcement of known, future system outages due to scheduled maintenance; and
using the identifier for detection of "signature" forms of Internet packets that indicate a presence of undesirable content.

11. The method of claim 10, wherein the undesirable content is a virus.

12. The method of claim 10, further including at least one of:
transmitting a message identifying the undesirable content to a provider; and
transmitting a bulletin message identifying the undesirable content to the subscriber.

13. The method of claim 12, further including logging the message identifying the undesirable content.

14. The method of claim 12, wherein the transmitting includes enforcing a delivery of other subscriber-beneficial information currently displayed on a manually accessed provider information Web site.

15. The method of claim 12, further including logging a successful transmission of bulletin messages to each subscriber and interactive responses that have been requested within the policy.

16. The method of claim 12, further including detecting and logging a number of simultaneously requested Web connections, based on the transmission of the bulletin messages.

17. The method of claim 16, further including flagging subscribers utilizing more than one simultaneous device per subscription.

18. The method of claim 16, further including transmitting explanations to be issued, in an enforced manner, to subscribers, after a service interruption, in such a manner as to alleviate customer dissatisfaction by illuminating and explaining a problem and future efforts to be taken to eliminate said problem.

19. A non-transitory computer readable storage medium comprising instructions when executed cause a processor to perform:
accessing subscriber upstream traffic to a destination web site requested by a subscriber;
sending, by a consolidating and management device located at a provider of Internet services, policy information related to data services and management control provided by the consolidating and management device to the subscriber; and
examining the accessed subscriber upstream traffic to determine whether to send a redirection to the bulletin message to the subscriber, wherein the examining occurs without modifying the accessed subscriber upstream traffic.

20. A system, comprising:
a first device; and
a second device communicably coupled to the first device;
wherein the first device:
accesses subscriber upstream traffic to a destination web site requested by at least one subscriber, wherein the first device interconnects between the at least one subscriber and a destination web site;
the second device, located at a provider of Internet services, sends, to the first device, policy information related to data services and management control provided by the second device; and
the first device examines the accessed subscriber upstream traffic to determine whether to send a redirection to the bulletin message to the at least one subscriber, wherein the first device examines without the accessed subscriber upstream traffic being modified.

* * * * *